April 23, 1940.  L. LEITZ  2,197,939
PHOTOELECTRIC EXPOSURE METER FOR CAMERAS
Filed July 20, 1938   2 Sheets-Sheet 1
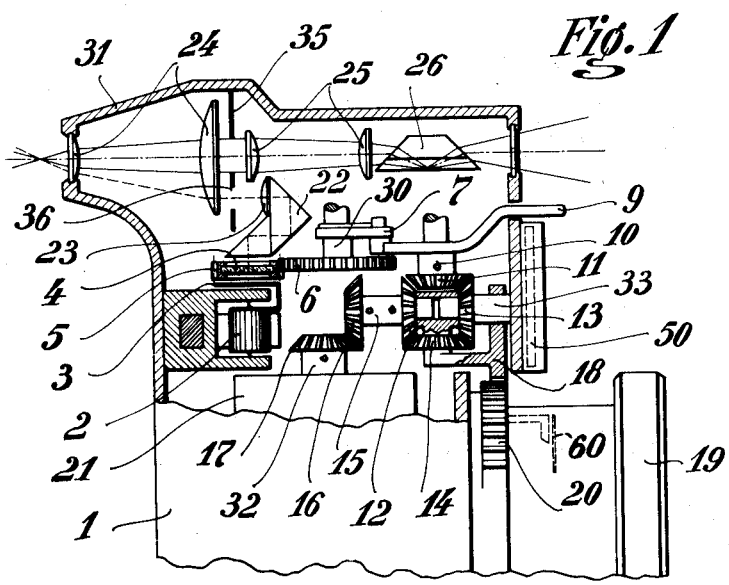
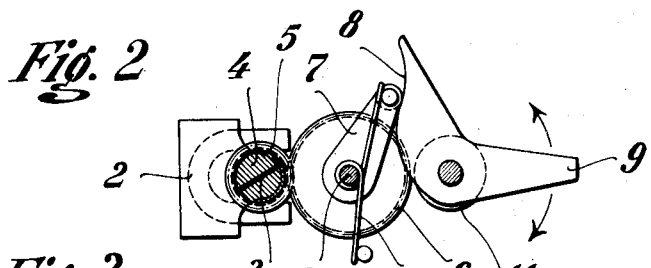
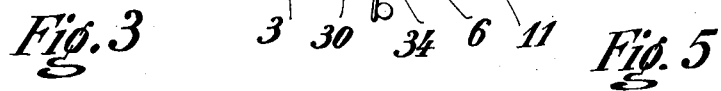
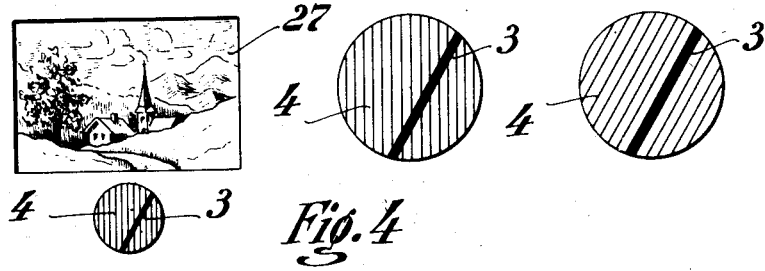
INVENTOR
*Ludwig Leitz*
BY
ATTORNEY

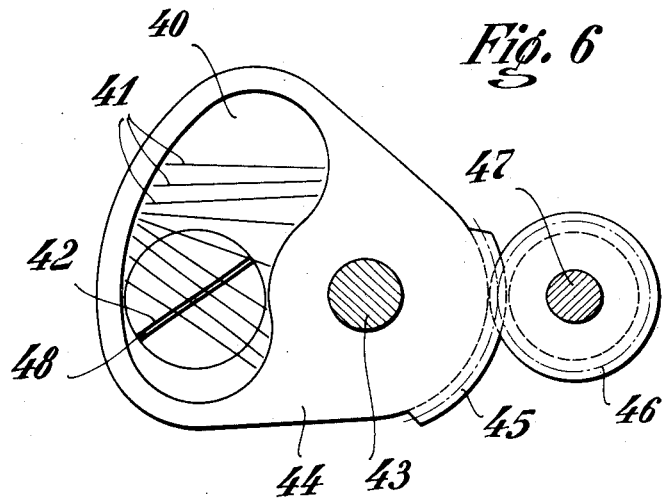
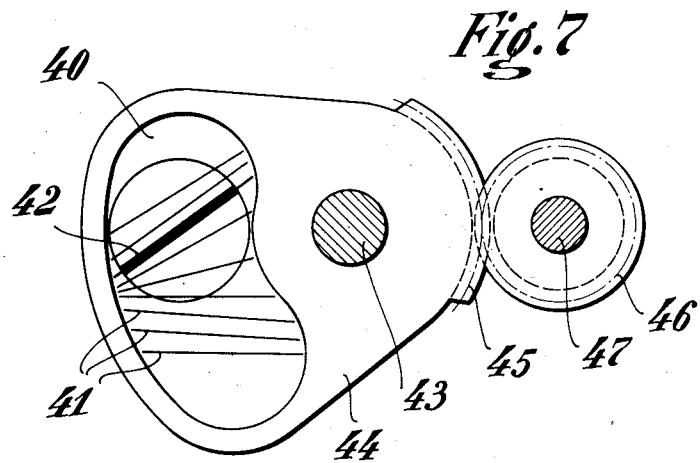

Patented Apr. 23, 1940

2,197,939

UNITED STATES PATENT OFFICE 2,197,939

PHOTOELECTRIC EXPOSURE METER FOR CAMERAS

Ludwig Leitz, Wetzlar, Germany, assignor to Ernst Leitz, G. m. b. H., Wetzlar, Germany Application July 26, 1938, Serial No. 220,213
In Germany July 22, 1937

3 Claims. (Cl. 95—10)

This invention relates to photoelectrical exposure meters for photographic cameras of the type in which a pointer or like element is set to follow the movements of the galvanometer needle, such pointer or element in turn being connected to a suitable mechanism for adjusting the shutter or diaphragm of a camera to which the exposure meter is attached.

When such an exposure meter is built into a modern relatively small hand camera, all the parts of the exposure meter must likewise be made very small for practical reasons. But such reduction in size of the several elements in turn results in the objectionable feature that the movements of the galvanometer needle becomes too small and uneven so that it can no longer be used as a correct guide for adjusting the shutter or diaphragm, or both, so as to obtain correct exposure. This is a very objectionable feature in such small exposure meter which is easily realized when it is remembered that for instance the shutter may have an adjustment range from 1 to $\frac{1}{1000}$ of a second with perhaps a dozen values in between. In such case the setting of such additional pointer or element to follow the movements of the galvanometer needle is not sufficiently accurate or practical.

The object of this invention is to provide an improved photoelectric exposure meter of the type described by providing a grid plate or like element which is rotated to follow the movements of the galvanometer needle until the latter appears between two of the grid bars. This results in what is known as adjustment with respect to a slit or beam of light. Such adjustment is easily observed, very accurate and is not influenced by lost movement or other factors of uneven operation on the part of the galvanometer needle. Another advantage is that the grid plate need not be located concentric with the galvanometer needle such as is necessary when a second needle, pointer or like element is utilized. The image of the grid plate and the galvanometer needle may be included in the field of view of a view finder attached to the camera whereby the photographing of the object is facilitated.

Accordingly this invention is embodied in a photoelectric exposure meter of the type set forth arranged and constructed as hereinafter described and as illustrated in the accompanying drawings in which Fig. 1 is a view, partly in section and partly diagrammatic of a camera and the exposure meter according to this invention with parts broken away.

Fig. 2 is a detail view showing the mechanism for rotating the grid plate.

Fig. 3 illustrates the field of view of the view finder with the grid plate and galvanometer needle appearing therein.

Figs. 4 and 5 illustrate the relative positions of the grid plate and galvanometer needle before and after adjustment.

Figs. 6 and 7 illustrate a modification.

Referring to Figs. 1 and 2 the numeral 1 indicates diagrammatically a camera which is provided with an objective 19 and a shutter 21 shown in outline only. They may be of any suitable construction. The galvanometer 2 is operated by the photoelectric cell 50 in the usual manner and is provided with a needle 3. A grid plate 4 or like element is suitably supported to be rotated within the area covered by the movements of the needle 3. The center of rotation of the grid plate may be concentric or eccentric with respect to the movement of the galvanometer needle depending upon the most practical or desirable form of construction selected.

In the present instance the grid plate 4 is carried by a gear 5 which meshes with a larger gear 6 on a shaft 30. The latter carries an arm 7 which by a spring 34 is held in operative contacting relation with a cam 8 secured to a shaft 10 and provided with an operating finger 9 which projects from the housing 31 of the exposure meter as shown. The shutter is provided with a shutter setting shaft 32 for adjusting the shutter. The shaft carries a gear 17 in mesh with a gear 16 fast upon a suitably supported shaft 15. The latter also carries another gear 12 which meshes with a gear 14 which rotates loosely on a pivot which is a part of a toothed sector 18. The sector swings about a fixed shaft 33 and meshes with a gear 20 carried by the objective 19 for adjustment of the diaphragm diagrammatically indicated at 60. Upon the shaft 33 turns loosely a gear 13 which meshes with a gear 11 fast upon the cam shaft 10.

The exposure meter includes a view finder comprising an ocular 24, a view finder objective 25 and an image erecting prism 26. Between the finder ocular and finder objective there is a mask 35 for framing the view and which mask also has an opening 36 through which the image of the grid plate and the galvanometer needle is seen, said image being reflected by a suitable optical system such as the prism 22 and lens 23. The specific supporting means for the aforesaid elements are not shown as they may be of any usual and suitable construction known to the art.

The exposure meter is used either to ascertain the correct shutter setting required for a predetermined diaphragm opening, or to ascertain the diaphragm opening required for a predetermined shutter setting or speed depending upon the nature of the object and prevailing light conditions. Assuming that the diaphragm opening has been decided upon the operation to adjust the shutter is as follows: The photoelectric cell is exposed to the light from the objective and the galvanometer needle swings in accordance with the force of the current. The operator then moves the finger 9 while holding on to the objective gear 20 whereby the grid plate is rotated from the position shown in Fig. 4 to the position shown in Fig. 5, i. e., the grid plate is rotated until the galvanometer needle 3 appears between two of the grid bars. The movement of finger 9 causes rotation of the gear 11. Hence gears 13 and 14 turn idly and thereby in turn the gear 12 is rotated to communicate the movement to the shutter setting shaft 32 and the shutter is thus automatically set at the required speed. If the diaphragm 60 is to be adjusted to correspond to a predetermined shutter speed, the operation is repeated but this time the shutter shaft is held immovable. Hence when the finger 9 is moved, the rotation of gear 11 again causes rotation of gears 13 and 14. This time however, the gear 14 travels bodily up upon the gear 12 which stands still. Hence the sector 18 is swung about the shaft 33 and the objective gear 20 is rotated to adjust the diaphragm.

Figs. 6 and 7 illustrate a modification which represents a somewhat simpler construction from that shown in Fig. 1. In Figs. 6 and 7 the grid plate 40 is provided with angularly disposed bars or lines 41 so arranged that when any one of them is brought into parallelism with the galvanometer needle 42, the difference in lengths of movements between the needle and that necessary to adjust the shutter and diaphragm is compensated for.

The grid plate is carried by a plate mount 44 which swings about a pivot 43. The mount has a toothed sector 45 for engaging a gear 46 on a shaft 47. The latter is suitably connected to the shutter and the diaphragm, such connection not being shown.

In Fig. 6 the grid plate mount 44 may be actuated by a finger piece attached to the mount or the shaft 47 may be so actuated. Such actuating means are not shown because they are suggested by the disclosure in Figs. 1 and 2. In Fig. 6 the shaft 47 and gear 46 are means for operating the grid plate mount.

The galvanometer needle 42 may be split so as to form a space 48 through which the grid bar or line 41 may be observed when the parts are brought into register. If the needle 42 is solid as in Fig. 2 for instance the grid mount is rotated until a grid bar is parallel to the needle with possibly a very thin space of light between the bar and the needle to insure parallelism.

The grid may be of any suitable construction. It may be an open ring member with fine bars or wires strung across the same. It may be of any transparent material with the bars painted or etched thereon.

The construction shown in Figs. 6 and 7 may of course be included in the view finder arrangement shown in Fig. 1 so that by similar means the image of the grid plate and the galvanometer needle in Fig. 6 may be caused to appear in the field of the view finder as indicated in Fig. 3.

I claim:

1. An exposure meter for use in a photographic camera having a manually operated shaft for operating an exposure controlling member, said exposure meter comprising a galvanometer with needle and a photoelectric cell for actuating the galvanometer, a rotatable grid plate having a plurality of grid bars, means operatively engaging said manually operated shaft for rotating said grid plate within the area of the swinging movement of said needle to move all of said grid bars into registering parallelism with the galvanometer needle when the latter has been moved in response to an exposure of said photoelectric cell for the purpose set forth.

2. An exposure meter for use in a photographic camera having a manually operated shaft for operating an exposure controlling member, said exposure meter comprising a galvanometer with needle and a photoelectric cell for actuating the galvanometer, a rotatable grid plate having a plurality of non-parallel grid bars, means operatively engaging said manually operated shaft for rotating said grid plate within the area of the swinging movement of said needle to move some of said grid bars into registering parallelism with the galvanometer needle when the latter has been moved in response to an exposure of said photoelectric cell for the purpose set forth.

3. An exposure meter according to claim 2 characterized by that the center of rotation of said rotatable grid plate is non-concentric with the galvanometer needle pivot.

LUDWIG LEITZ.